(12) United States Patent
Stuehrenberg

(10) Patent No.: US 7,637,460 B2
(45) Date of Patent: Dec. 29, 2009

(54) METHODS AND APPARATUS FOR A CABLE RETRACTOR TO PREVENT CABLE DAMAGE AFTER CONNECTOR RELEASE

(75) Inventor: Justin C. Stuehrenberg, Indianapolis, IN (US)

(73) Assignee: Raytheon Company, Waltham, MA (US)

( * ) Notice: Subject to any disclaimer, the term of this patent is extended or adjusted under 35 U.S.C. 154(b) by 344 days.

(21) Appl. No.: 11/615,419

(22) Filed: Dec. 22, 2006

(65) Prior Publication Data
US 2008/0148897 A1    Jun. 26, 2008

(51) Int. Cl.
B64D 1/12    (2006.01)
(52) U.S. Cl. .................................................. 244/137.4
(58) Field of Classification Search ............... 244/137.4, 244/1 R; 89/1.54, 1.811, 1.81; 294/82.26; 242/129.2, 370, 388.9, 129.3; 114/328
See application file for complete search history.

(56) References Cited

U.S. PATENT DOCUMENTS

| | | | | | |
|---|---|---|---|---|---|
| 1,940,701 | A | * | 12/1933 | Shope | ......................... 242/371 |
| 2,412,035 | A | * | 12/1946 | Dornak | ..................... 116/28 R |
| 2,837,292 | A | * | 6/1958 | Adamson | ..................... 242/372 |
| 3,444,779 | A | * | 5/1969 | Buell | ......................... 89/1.811 |
| 3,509,515 | A | * | 4/1970 | Acord | ......................... 439/258 |
| 3,593,613 | A | * | 7/1971 | Davis | ........................ 89/1.811 |
| 4,557,436 | A | * | 12/1985 | Drake | .......................... 242/372 |
| 6,151,824 | A | * | 11/2000 | Clayton | .......................... 42/54 |
| 7,182,013 | B1 | * | 2/2007 | Hardo | ........................ 89/1.811 |
| 2006/0283315 | A1 | | 12/2006 | Blackburn | |

FOREIGN PATENT DOCUMENTS

EP    0 593 347 A    4/1994
FR    2 697 005 A    4/1994

OTHER PUBLICATIONS

Notification of transmittal of the International Search Report dated Nov. 24, 2008, PCT/US2007/088019.
The International Search Report dated Nov. 24, 2008, PCT/US2007/088019.
Written Opinion of the International Searching Authority dated Nov. 24, 2008, PCT/US2007/088019.
Notification Concerning Transmittal of International Preliminary Report on Patentability (Chapter 1 of the Patent Cooperation Treaty) PCT/US2007/088019, mailed Jul. 2, 2009.
Written Opinion of the International Searching Authority, PCT/US2007/088019, mailed Jul. 2, 2009.

* cited by examiner

*Primary Examiner*—Tien Dinh
(74) *Attorney, Agent, or Firm*—Daly, Crowley, Mofford & Durkee, LLP

(57) ABSTRACT

Methods and apparatus for a cable retractor device to remove slack in a lanyard coupled to a cable connector after release of an item from a vehicle. In one embodiment, the cable retractor device removes slack after the item is released from an aircraft to reduce the likelihood of damage from the connector being buffeted by wind forces.

19 Claims, 7 Drawing Sheets

METHODS AND APPARATUS FOR A CABLE RETRACTOR TO PREVENT CABLE DAMAGE AFTER CONNECTOR RELEASE

BACKGROUND

As is known in the art, vehicles, such as aircraft, can carry items adapted to be released from the vehicle. Prior to release, the item may be attached to the aircraft and can be connected by a communication cable, such as for programming and exchanging information. For example, systems may communicate with the item via a cable to input navigation information. However, during the release process, the cable may be damaged by excessive forces on the cable and/or cable connector.

Conventional mechanisms typically utilize a lanyard attached to a cable, which is looped over a bail bar fixed to a rack secured to the aircraft. The connector separates from the item once the tension in the lanyard reaches a predetermined amount. With the amount of slack in the lanyard required to accommodate a range of connector locations, after release the item can roll before connector separation causing damage due to an excessive pull angle on the connector. Once the item is released, the cable can cause further damage by becoming caught in the air stream and striking the rack with great force.

SUMMARY

The present invention provides methods and apparatus for a cable retractor mechanism to prevent damage to an electrical cable after release from an item. With this arrangement, an item, such as a missile, coupled to an aircraft by a cable can be released after which the cable retractor mechanism pulls on a lanyard to ensure that the connector does not cause damage due to wind forces. While exemplary embodiments of the invention are primarily shown and described in conjunction with releasing a missile from an aircraft, it is understood that the invention is applicable to the release of items in general in which it is desirable to reduce damage from a component attached to a lanyard.

In one aspect of the invention, a cable retractor device comprises a rail, a first arm movably engaged to the rail and a second arm engaged to the rail, wherein the first arm includes a mechanism to channel a lanyard for engagement with the second arm, and a first bias mechanism coupled to the first arm for removing slack from the lanyard.

The cable retractor device can further include one or more of the following features:
a second bias mechanism coupled to the second arm, wherein the second arm is movably engaged to the rail, the first bias mechanism biases the first arm to a first end of the rail, the second bias mechanism biases the second arm to a second end of the rail, the mechanism includes an aperture through which the lanyard can pass, the rail includes teeth to engage the first arm, the first arm includes a movement mechanism to allow unidirectional movement of the first arm with respect to the rail, the unidirectional movement is substantially parallel to a longitudinal axis of the rail, the second arm includes a movement mechanism to allow unidirectional movement of the second arm with respect to the rail, the movement mechanism includes a tapered surface on the first arm to engage teeth on the rail, the first arm moves on the rail away from the second arm to remove the lanyard slack, the lanyard is coupled to a connector adapted to connect with a releasable item secured to a vehicle, the vehicle is an aircraft, the connector conforms to military standard MIL-STD-1760, and the second arm includes at least one hook to engage the lanyard.

In a further aspect of the invention, a system comprises an aircraft, a releasable item secured to the aircraft, the item being coupled to the aircraft via a cable having a connector, and a cable retractor device comprising: a rail, a first arm movably engaged to the rail and a second arm engaged to the rail, wherein the first arm includes a mechanism to channel a lanyard for engagement with the second arm, and a first bias mechanism coupled to the first arm for removing slack from the lanyard.

In another aspect of the invention, a method comprises movably engaging a first arm to a rail and engaging a second arm to the rail, wherein the first arm includes a mechanism to channel a lanyard for engagement with the second arm, and providing a first bias mechanism coupled to the first arm for removing slack from the lanyard;

BRIEF DESCRIPTION OF THE DRAWINGS

The foregoing features of this invention, as well as the invention itself, may be more fully understood from the following description of the drawings in which.

DETAILED DESCRIPTION

Figure 1:
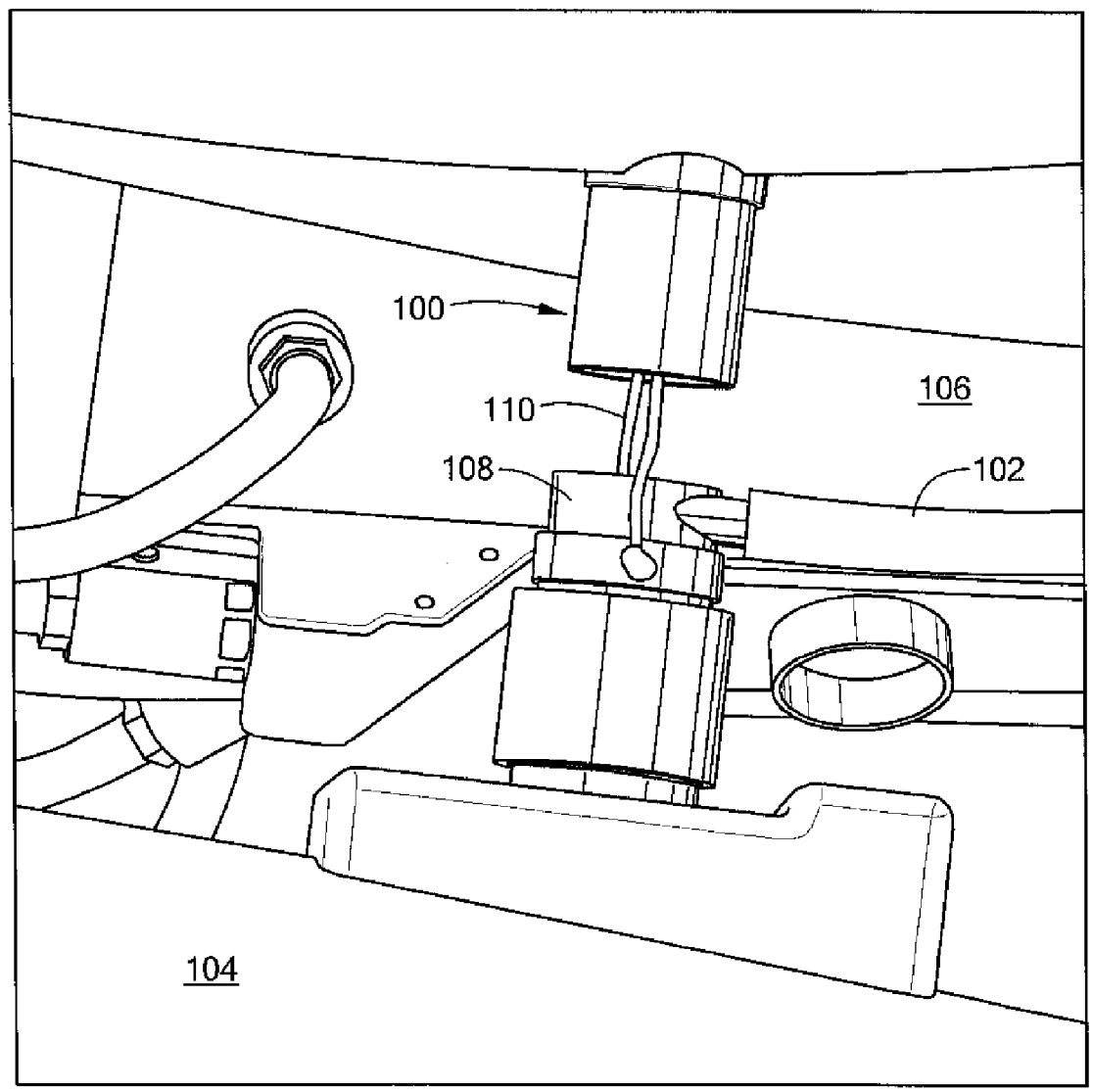
FIG. 1 is a pictorial representation of an exemplary cable retractor device for releasing an item from a vehicle in accordance with exemplary embodiments of the invention.

FIG. 1 shows an exemplary embodiment of a cable retractor 100 to minimize cable 102 and/or connector 108 damage when an item 104 is released from a moving vehicle 106, such as an aircraft. It is understood that the cable 102 can include electrical and other connections and a lanyard 110 to facilitate removal of the connector 108. In one particular embodiment, the cable connector 108 conforms to military standard MIL-STD-1760 for cable connectors.

In one embodiment, the cable retractor system 100 is useful when items 104, such as missiles, separate from an aircraft 106. In general, the cable retractor 100 enhances the process of detaching the cable connector 108 using the lanyard 110 to reduce the likelihood of damage to the cable/connector. More particularly, the cable retractor 100 removes slack in the lanyard 110 so that as the item separates from the aircraft 106 the connector reaches a given release pressure threshold before the item 104 has a chance to roll or otherwise change position in the air stream. Reducing lanyard 110 slack leads to less damage to the connector 108 due to a straighter pull angle. In one embodiment, after the connector 108 has been pulled from the item, the connector is pulled up to the retractor, and the connector is secured to prevent the cable and connector from being buffeted by the air currents for reducing the possibility of damage to the aircraft and/or cable/connector.

Figure 2:
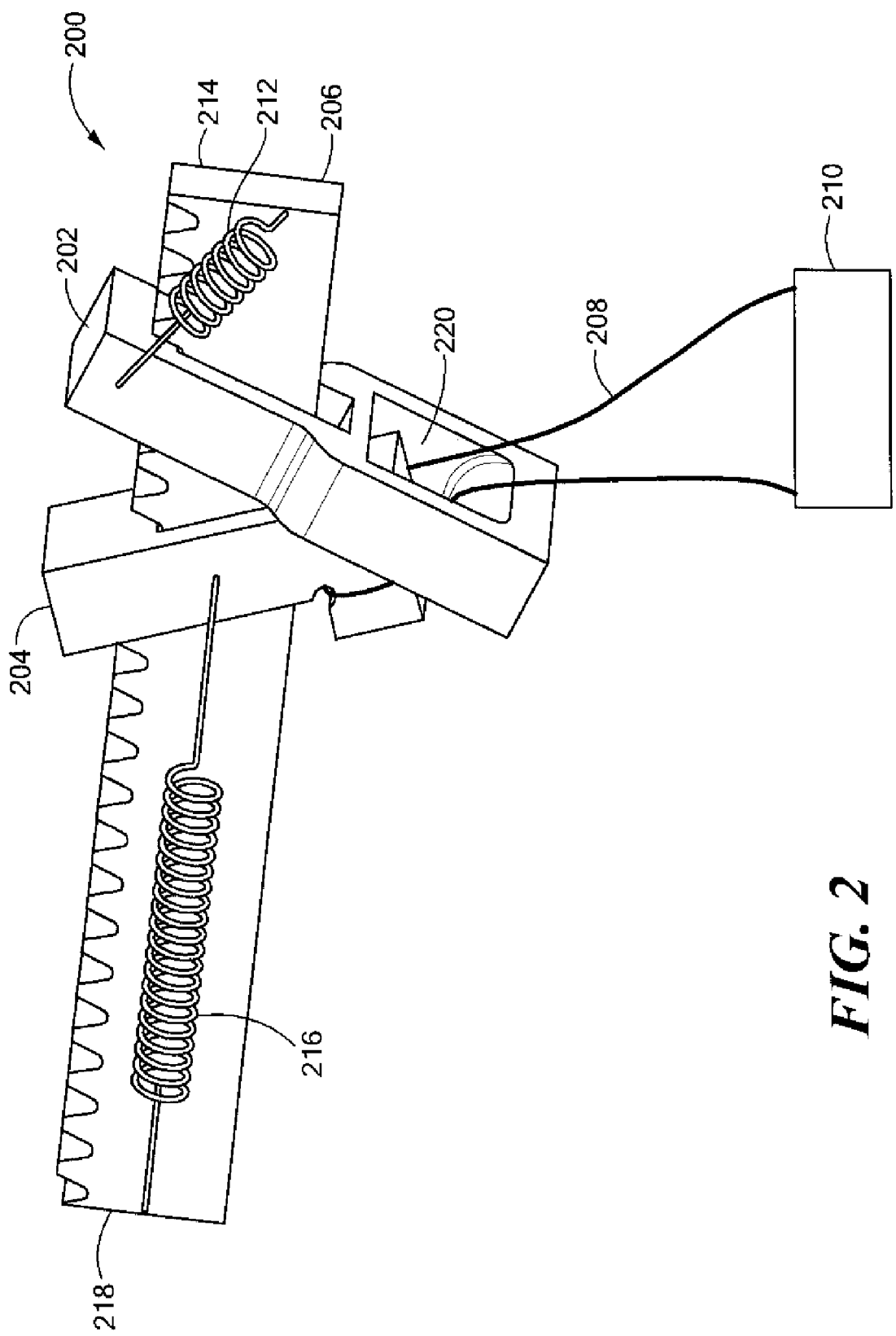
FIG. 2 is a pictorial representation of a cable retractor device having first and second arms.

FIG. 2 shows an exemplary embodiment of a cable retractor 200 having first and second arms 202, 204 that move along an elongate rail 206 to remove slack from a lanyard 208 secured to a connector 210 released from an item, such as a missile. The cable retractor is shown without a housing. A first bias mechanism 212, shown as a spring, is secured between a first end 214 of the rail and the first arm 202. A second bias mechanism 216, also shown as a spring, is secured between a second end 218 of the rail and the second arm 204. In one embodiment, the first arm 202 has an aperture 220 through which the lanyard 208 passes. The lanyard 208 is secured to the second arm 204 of the cable retractor 200.

After the connector 210 is attached to an item, such as a missile, the bias mechanism 216 is allowed to pull the second arm 204 toward the second end 218. This results in 204 pulling the lanyard 208 through aperture 220 in the first arm 202 until slack in the lanyard 208 is removed.

Figure 2A:
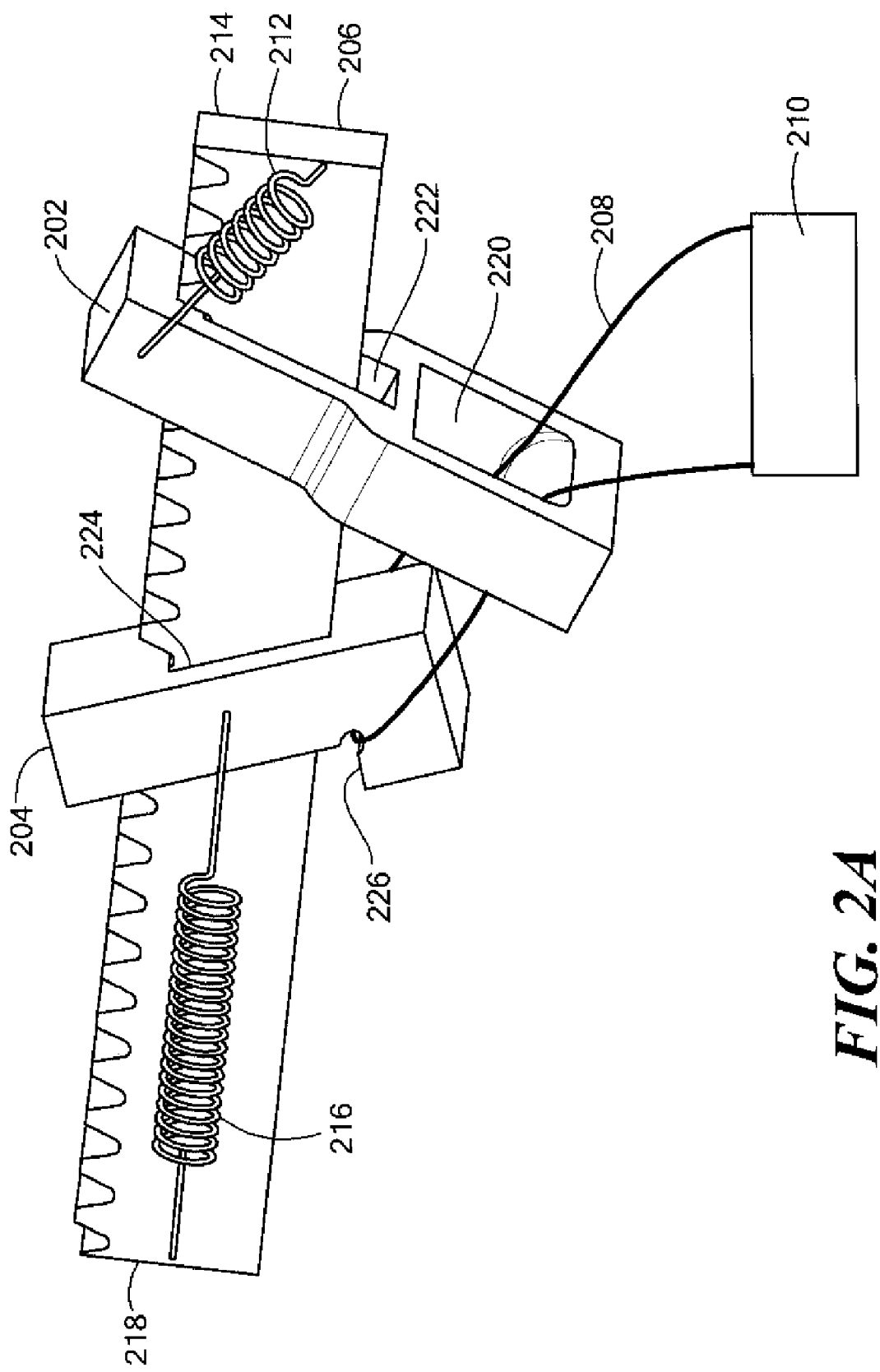
FIGS. 2A and 2B show a cable retractor device removing slack from a lanyard.
Figure 2B:
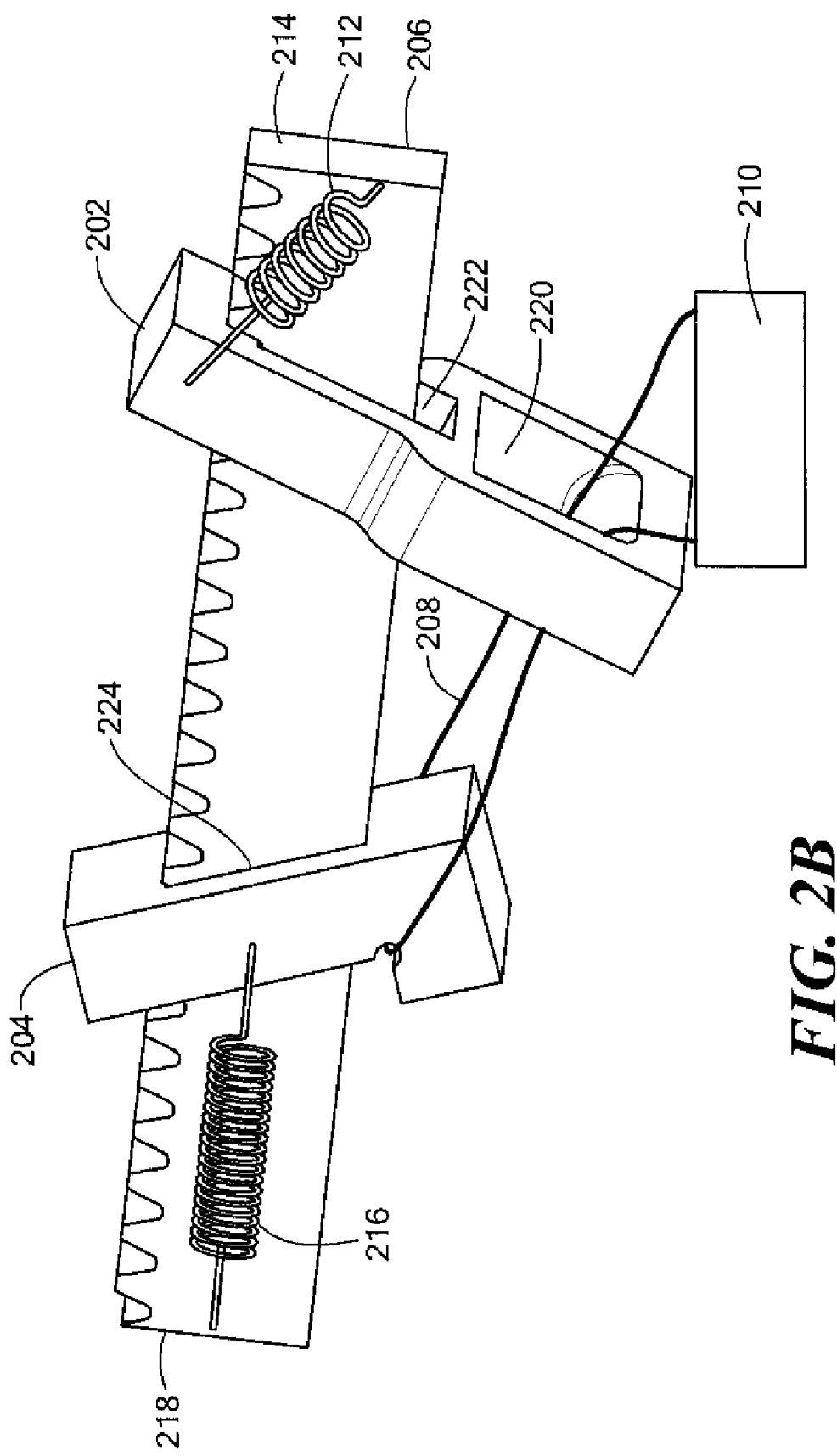

As shown in FIGS. 2A-B, after the connector 210 is released the second arm 204 pulls the lanyard 208 through the aperture 220 in the first arm 202 as the second bias mechanism 216 pulls the second arm 204 away from the first arm 202. As the second arm 204 moves along the rail 206, the connector 210 is pulled toward the cable retractor 200 to secure connector 210 against retractor 200. With this arrangement, the connector 210 is not left to flap around in the wind potentially damaging the aircraft or other components.

In the illustrated embodiment, the first and second arms 202, 204 include respective channels 222, 224 to enable the arms to move along the rail 206. The second arm 204 includes an engagement mechanism 226, shown as a hook, to engage the lanyard and pull it through the aperture 220 in the first arm 202.

It is understood that a variety of modifications will be readily apparent to one of ordinary skill in the art without departing from the invention. For example, the engagement mechanism can be provided as any suitable mechanism that allows a user to secure a lanyard to the second arm. In addition, the first and second arms can be movably coupled to the rail using any suitable mechanism that allows the arm to reciprocate in a linear or non-linear way. Further, while the bias mechanisms are shown as springs, any number of alternative devices can be used to provide a similar function.

Figure 3A:
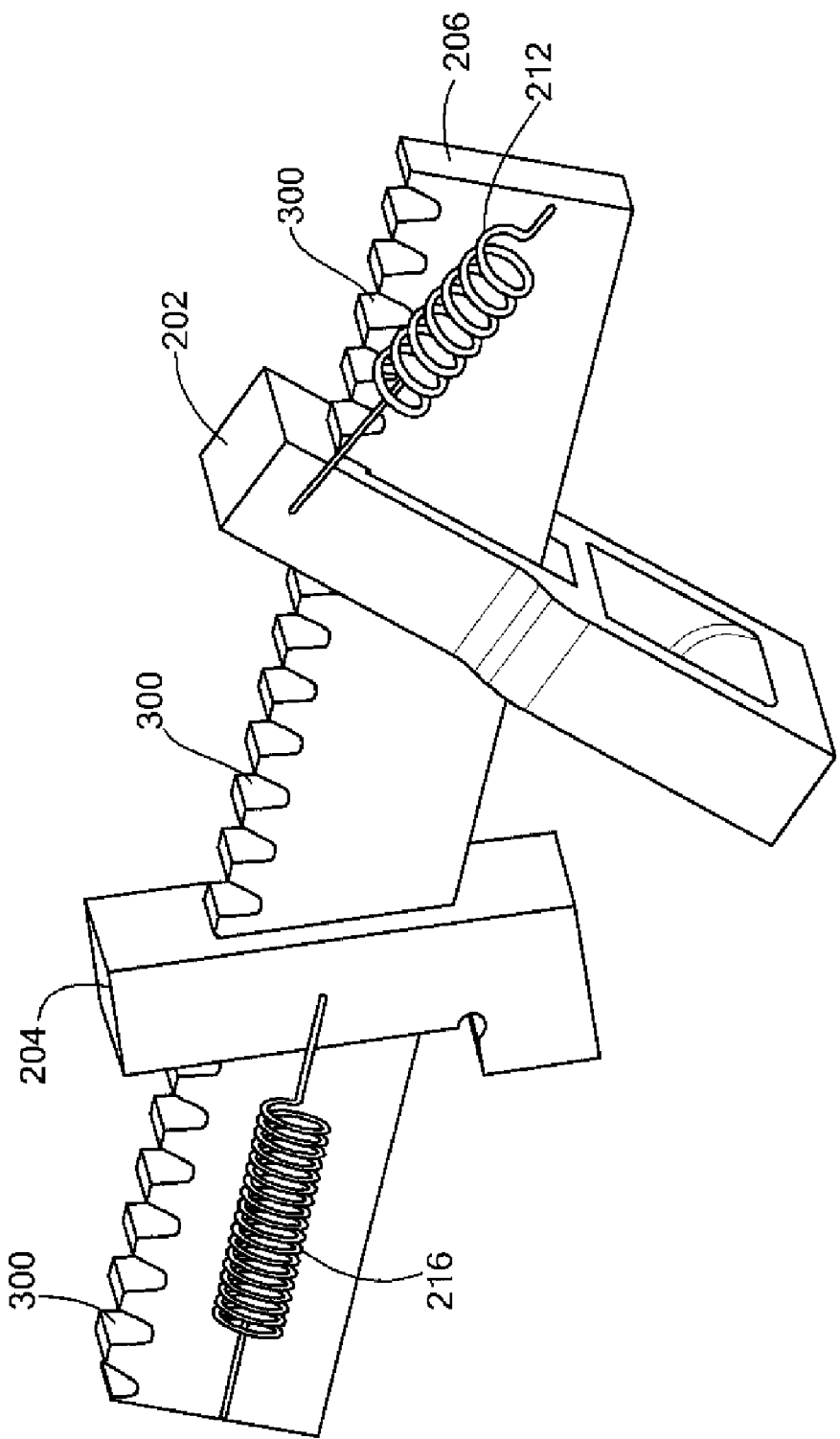
FIGS. 3A and 3B show a cable retractor device with movement of first and second arms along a rail.
Figure 3B:
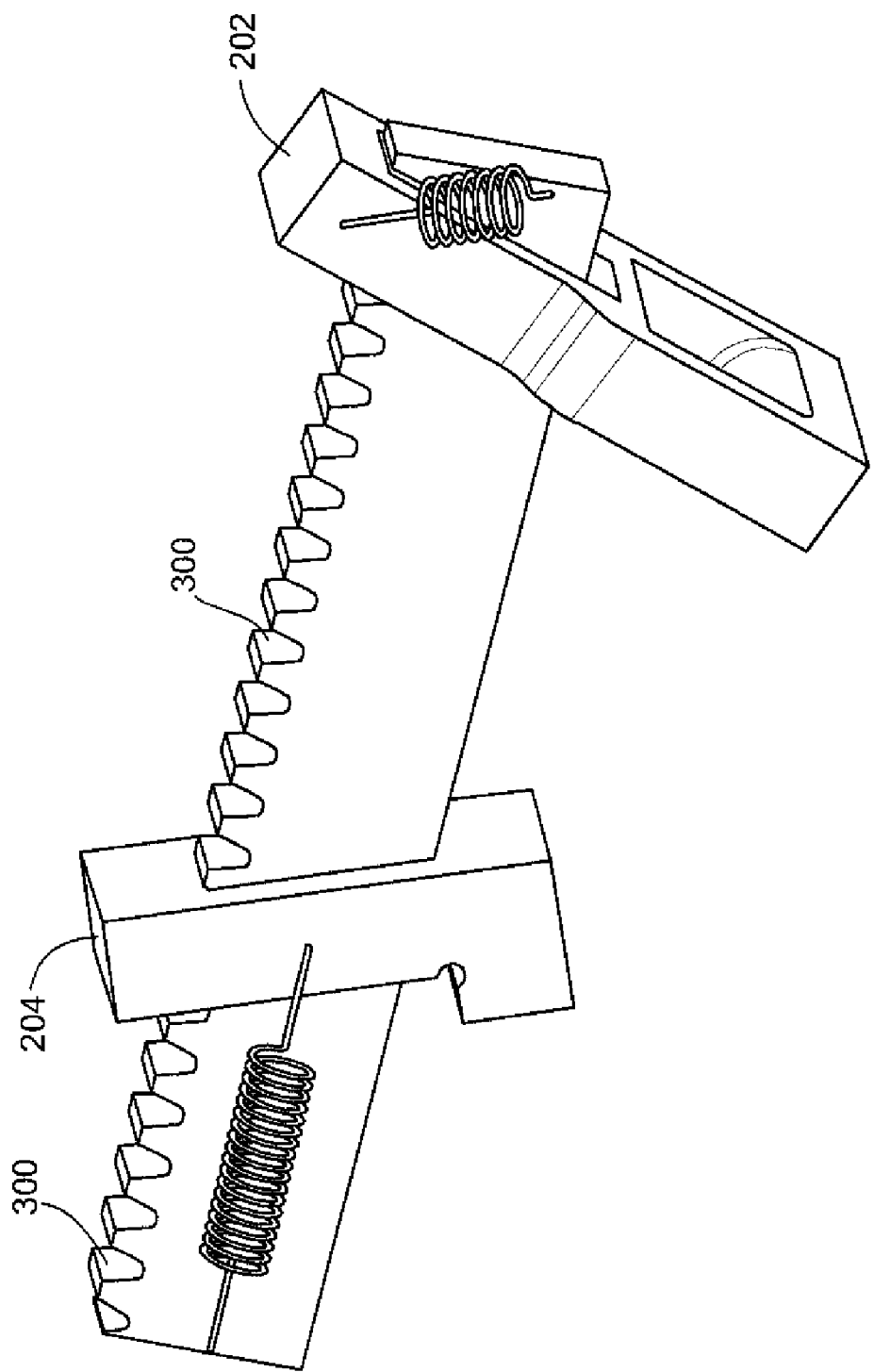

FIGS. 3A and 3B show the rail 206 having a series of teeth 300 that provide uni-directional or bi-directional movement of the first and/or second arms 202, 204 along the rail. The first and second arms 202, 204 can be initially positioned on the rail 206 based upon the connector and lanyard length prior to release of the connector. That is, the first and second arms 202, 204 can be positioned on the rail to engage the lanyard and remove a desired amount of slack in the lanyard when an item, such as a missile, is secured to the aircraft.

Figure 4:
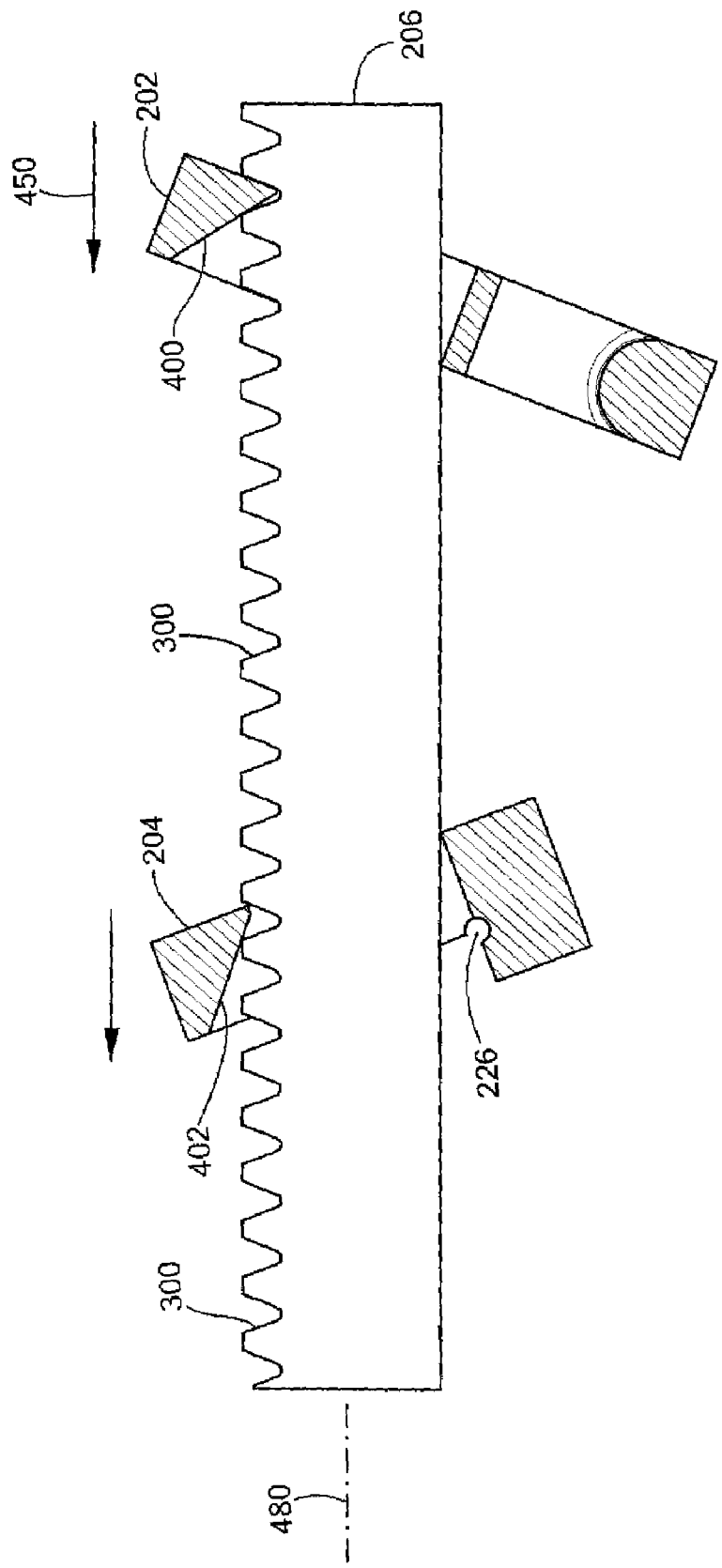
FIG. 4 shows a cable retractor device with a movement mechanism to provide unidirectional movement.

FIG. 4 shows an exemplary configuration to provide uni-directional movement of the first and second arms 202, 204 along a longitudinal axis 480 of the rail. The first arm 202 includes a first tapered surface 400 to engage the teeth 300. The angle of the first tapered surface 400 enables the first arm 202 to move along the rail only in a right to left direction 450 looking at the Figure. The first bias mechanism 212 maintains the first arm in position.

Similarly, the second arm 204 includes a second tapered surface 402 having an angle generally similar to the first tapered surface 400. The second arm 204 can move only to the left pulled by the second bias mechanism 216 (FIG. 2) when there is slack in the lanyard.

In an exemplary embodiment, when securing an item, such as a missile to an aircraft, a user moves the lanyard 208 through the aperture 200 in the first arm 202 and engages the lanyard to the hook 226 on an end of the second arm 204. The position of the first and/or second arm 202, 204 can be adjusted on the rail 206 based upon the amount of slack initially present in the lanyard with the item secured to the aircraft.

While in illustrated embodiments, the first and second arms are both shown to be movable along the rail, in other embodiments only one of the first and second arms is movable. In addition, while first and second bias mechanisms are shown, it is understood that a single bias mechanism may be coupled to the first and/or second arm.

The present invention provides methods and apparatus to enhance the survivability and reliability of cables and connectors during the separation of connected items, as well as to secure the just-released free end of the cable to prevent damage to the cable or item holder following release. Exemplary embodiments of the cable retractor reduce slack in the lanyard. After release, the cable retractor pulls on the lanyard to secure the connector against the base of the retractor assembly.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A cable retractor device, comprising:
a rail;
a first arm slidably engaged to the rail and a second arm engaged to the rail, wherein the first arm includes a mechanism to channel a lanyard for engagement with the second arm, wherein movement of the second arm in relation to the first arm moves the lanyard; and
a first bias mechanism coupled to the first arm for removing slack from the lanyard and to retract a cable connected to the lanyard.

2. The device according to claim 1, further including a second bias mechanism coupled to the second arm, wherein the second arm is movably engaged to the rail.

3. The device according to claim 1, wherein the first bias mechanism biases the first arm to a first end of the rail.

4. The device according to claim 2, wherein the second bias mechanism biases the second arm to a second end of the rail and the first bias mechanism biases the first arm to a first end of the rail.

5. The device according to claim 1, wherein the mechanism to channel the lanyard includes an aperture through which the lanyard can pass.

6. The device according to claim 1, wherein the rail includes teeth to engage the first arm.

7. The device according to claim 1, wherein the first arm includes a movement mechanism to allow unidirectional movement of the first arm with respect to the rail.

8. The device according to claim 7, wherein the unidirectional movement is substantially parallel to a longitudinal axis of the rail.

9. The device according to claim 1, wherein the second arm includes a movement mechanism to allow unidirectional movement of the second arm with respect to the rail.

10. The device according to claim 7, wherein the movement mechanism includes a tapered surface on the first arm to engage teeth on the rail.

11. The device according to claim 1, wherein the first arm moves on the rail away from the second arm to remove the lanyard slack.

12. The device according to claim 1, wherein the lanyard is coupled to a connector adapted to connect with a releasable item secured to a vehicle.

13. The device according to claim 12, wherein the vehicle is an aircraft.

14. The device according to claim 1, wherein the second arm includes at least one hook to engage the lanyard.

15. A system, comprising:
an aircraft;
a releasable item secured to the aircraft, the item being coupled to the aircraft via a cable having a connector; and
a cable retractor device, comprising:
a rail;
a first arm movably engaged to the rail and a second arm engaged to the rail, wherein the first arm includes a mechanism to channel a lanyard for engagement with the second arm, wherein movement of the second arm in relation to the first arm moves the lanyard; and
a first bias mechanism coupled to the first arm for removing slack from the lanyard.

16. The system according to claim 15, further including a second bias mechanism coupled to the second arm, wherein the second arm is movably engaged to the rail.

17. The system according to claim 15, wherein the first arm includes a movement mechanism to allow unidirectional movement of the first arm with respect to the rail.

18. A method for retracting a cable connector, comprising:
movably engaging a first arm to a rail and engaging a second arm to the rail, wherein the first arm includes a mechanism to channel a lanyard for engagement with the second arm, wherein movement of the second arm in relation to the first arm moves the lanyard;
providing a first bias mechanism coupled to the first arm for removing slack from the lanyard.

19. The method according to claim 18, wherein the lanyard is coupled to a connector matable to an item releasably secured to an aircraft, such that the connector is retracted after the item is released from the aircraft.

* * * * *